(12) United States Patent
Tsutsui

(10) Patent No.: US 10,118,492 B2
(45) Date of Patent: Nov. 6, 2018

(54) VEHICULAR FUEL CELL SYSTEM AND METHOD OF CONTROLLING THE SAME

(71) Applicant: TOYOTA JIDOSHA KABUSHIKI KAISHA, Toyota-shi, Aichi-ken (JP)

(72) Inventor: Tokuro Tsutsui, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/377,201

(22) Filed: Dec. 13, 2016

(65) Prior Publication Data

US 2017/0174083 A1 Jun. 22, 2017

(30) Foreign Application Priority Data

Dec. 17, 2015 (JP) ................................. 2015-245902

(51) Int. Cl.
| | |
|---|---|
| *H01M 8/04* | (2016.01) |
| *B60L 3/00* | (2006.01) |
| *H01M 8/04746* | (2016.01) |
| *H01M 8/04955* | (2016.01) |
| *H01M 16/00* | (2006.01) |
| *H01M 8/04089* | (2016.01) |
| *H01M 8/04313* | (2016.01) |
| *H01M 8/04664* | (2016.01) |

(52) U.S. Cl.
CPC ........... *B60L 3/0053* (2013.01); *B60L 3/0007* (2013.01); *H01M 8/04089* (2013.01); *H01M 8/04313* (2013.01); *H01M 8/04664* (2013.01); *H01M 8/04753* (2013.01); *H01M 8/04955* (2013.01); *H01M 16/006* (2013.01); *H01M 2250/20* (2013.01); *Y02T 90/32* (2013.01)

(58) Field of Classification Search
CPC ................ B60L 3/0007; B60L 3/0053; H01M 8/04753; H01M 8/04955; H01M 16/006
See application file for complete search history.

(56) References Cited

U.S. PATENT DOCUMENTS

| | | | |
|---|---|---|---|
| 2006/0137929 A1 | 6/2006 | Yoshida | |
| 2008/0093140 A1* | 4/2008 | Asai | B60K 1/00 180/65.1 |
| 2015/0343903 A1* | 12/2015 | Lee | H01M 8/04089 701/22 |

FOREIGN PATENT DOCUMENTS

| | | |
|---|---|---|
| JP | 3112168 | 9/2000 |
| JP | 2006-246623 | 9/2006 |
| JP | 2007-335184 | 12/2007 |

* cited by examiner

*Primary Examiner* — Cynthia H Kelly
*Assistant Examiner* — Monique M Wills
(74) *Attorney, Agent, or Firm* — Finnegan, Henderson, Farabow, Garrett & Dunner, LLP

(57) ABSTRACT

A vehicular fuel cell system includes a collision detector configured to detect collision on the front and rear sides of a vehicle, a high voltage unit arranged on one side of the front and rear sides of the vehicle, a high voltage controller arranged on the one side and configured to control the high voltage unit, a hydrogen supply unit arranged on the other side of the front and rear sides of the vehicle and configured to supply hydrogen to a fuel cell stack, and a supply valve controller arranged on the other side and configured to control a hydrogen supply valve, the hydrogen supply valve being configured to shut off a supply path of hydrogen from the hydrogen supply unit to the fuel cell stack.

7 Claims, 5 Drawing Sheets

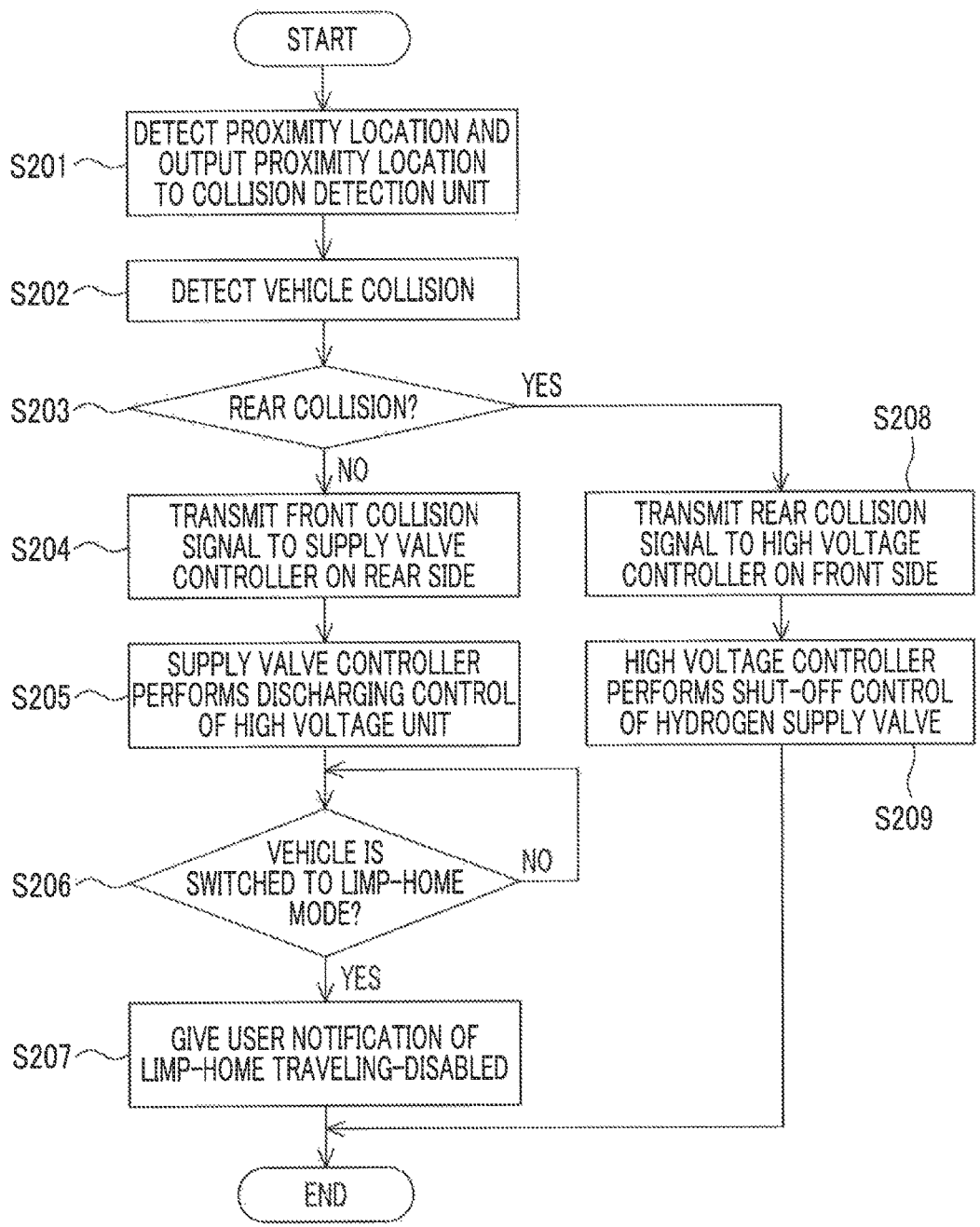

VEHICULAR FUEL CELL SYSTEM AND METHOD OF CONTROLLING THE SAME

The disclosure of Japanese Patent Application No. 2015-245902 filed on Dec. 17, 2015 including the specification, drawings and abstract is incorporated herein by reference in its entirety.

BACKGROUND

1. Technical Field

The disclosure relates to a vehicular fuel cell system and a method of controlling the same.

2. Description of Related Art

For example, a vehicular fuel cell system which, if collision of a vehicle is detected, shuts off the fuel supply to a fuel cell stack by a shut-off valve and shuts off a power system of the fuel cell stack by a relay is known (see Japanese Patent Application Publication No. 2007-335184 (JP 2007-335184 A)).

SUMMARY

However, in the above-described vehicular fuel cell system, for example, a controller which controls the relay of the power system and a controller which controls the shut-off valve of the fuel supply are respectively arranged at the front or rear of the vehicle. If collision at the front or rear of the vehicle occurs, the controllers may fail and may not function. In this case, there is a concern that shut-off of the fuel supply to the fuel cell stack and shut-off of the power system of the fuel cell stack are not properly performed. Accordingly, there is a need for reliably stopping the function of a control target, such as shut-off of the fuel supply to the fuel cell stack or shut-off of the power system of the fuel cell stack, even in a case where vehicle collision occurs.

The disclosure provides a vehicular fuel cell system and a method of controlling the same capable of reliably stopping the function of a control target even in a case where vehicle collision occurs.

A first aspect of the disclosure relates to a vehicular fuel cell system including a collision detector configured to detect collision on front and rear sides of a vehicle, a high voltage unit arranged on one side of the front and rear sides of the vehicle and having a high voltage, a high voltage controller arranged on the one side and configured to control the high voltage unit, a hydrogen supply unit arranged on the other side of the front and rear sides of the vehicle and configured to supply hydrogen to a fuel cell stack, and a supply valve controller arranged on the other side and configured to control a hydrogen supply valve, the hydrogen supply valve being configured to shut off a supply path of hydrogen from the hydrogen supply unit to the fuel cell stack. If collision is detected by the collision detector, the supply valve controller on the other side performs discharging control for discharging the high voltage unit on the one side, and the high voltage controller on the one side performs shut-off control for bringing the hydrogen supply valve on the other side into a closed state.

According to this aspect, in a case where collision occurs on one side of the vehicle, and the high voltage controller on one side fails, the supply valve controller which is at a location separated from the collision part on the other side of the vehicle unsusceptible to an impact of collision reliably performs the discharging control for discharging the high voltage unit. Furthermore, in a case where collision occurs on the other side of the vehicle, and the supply valve controller on the other side fails, the high voltage controller which is at a location separated from the collision part on one side of the vehicle unsusceptible to an impact of collision reliably performs the shutoff control for bringing the hydrogen supply valve into the closed state. That is, it is possible to reliably stop the function of a control target even in a case where vehicle collision occurs.

A proximity sensor configured to detect distance information with respect to an object may be provided on each of the one side and the other side in the periphery of the vehicle, when the collision detector detects collision on the one side based on the distance information from the proximity sensor on the one side, the supply valve controller on the other side may perform the discharging control for discharging the high voltage unit according to a detection result of the collision detector and when the collision detector detects collision on the other side based on the distance information from the proximity sensor on the other side, the high voltage controller on the one side may perform the shut-off control for bringing the hydrogen supply valve into the closed state according to the detection result of the collision detector.

With this, only the control on a side, on which collision is detected, between the discharging control of the high voltage unit on one side and the shut-off control of the hydrogen supply valve on the other side is executed by determining a collision location of the vehicle using the proximity sensors. With this, it is possible to stop only the function of the side, on which collision is detected, between the high voltage unit on one side and the hydrogen supply unit on the other side, and to continue the function of a side on which collision is not detected.

The vehicular fuel cell system may further include a traveling determination unit configured to determine whether or not the vehicle is in a traveling-disabled state, and a notification unit configured to give a user notification that the vehicle is in the traveling-disabled state, and when the collision detector detects collision on the one side, the supply valve controller on the other side may perform the discharging control for discharging the high voltage unit according to the detection result of the collision detector, the traveling determination unit may determine that the vehicle is in the traveling-disabled state according to the detection result of the collision detector, and the notification unit may give notification to the effect that the vehicle is in the traveling-disabled state.

With this, when collision on one side is detected, it is possible to give a user notification to the effect that the vehicle is in the traveling-disabled state and to prevent unreasonable retreat traveling while reliably performing the discharging control of the high voltage unit on one side.

The high voltage controller may be provided closer to a vehicle center than the high voltage unit in a front-rear direction of the vehicle.

The hydrogen supply unit may include a hydrogen storage tank, and the supply valve controller may be provided closer to a vehicle center than the hydrogen storage tank in a front-rear direction of the vehicle.

Only the supply valve controller may perform the discharging control of the high voltage unit, and only the high voltage controller may perform the shut-off control of the hydrogen supply valve.

The high voltage unit may include a battery.

A second aspect of the disclosure relates to a method of controlling a vehicular fuel cell system including a high voltage unit arranged on one side of front and rear sides of the vehicle and having a high voltage, a high voltage controller arranged on the one side and configured to control the high voltage unit, a hydrogen supply unit arranged on the other side of the front and rear sides of the vehicle and configured to supply hydrogen to a fuel cell stack, and a supply valve controller arranged on the other side and configured to control a hydrogen supply valve, the hydrogen supply valve being configured to shut off a supply path of hydrogen from the hydrogen supply unit to the fuel cell stack. In this control method, when collision on the one side or the other side is detected, the supply valve controller on the other side performs discharging control for discharging the high voltage unit on the one side, and the high voltage controller on the one side performs shut-off control for bringing the hydrogen supply valve on the other side into a closed state.

According to the disclosure, it is possible to provide a vehicular fuel cell system and a method of controlling the same capable of reliably stopping the function of a control target even in a case where vehicle collision occurs.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart showing a control processing flow of the vehicular fuel cell system according to the third embodiment of the disclosure.

DETAILED DESCRIPTION OF EMBODIMENTS

First Embodiment

Figure 1:
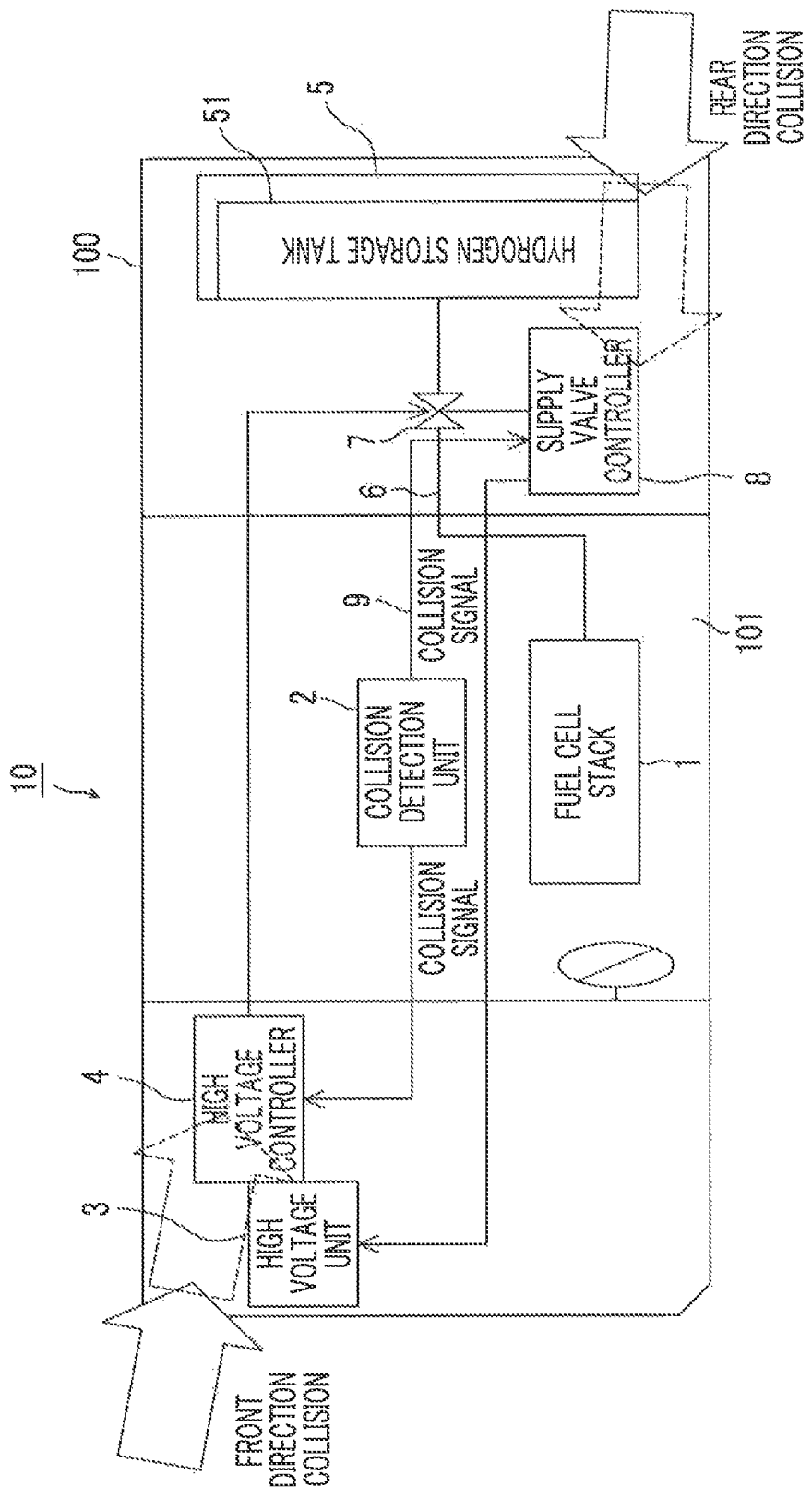
FIG. 1 is a block diagram showing a schematic system configuration of a vehicular fuel cell system according to a first embodiment of the disclosure.

Hereinafter, an embodiment of the disclosure will be described referring to the drawings. FIG. 1 is a block diagram showing a schematic system configuration of a vehicular fuel cell system according to a first embodiment.

A vehicular fuel cell system 10 according to the first embodiment is mounted in a fuel cell vehicle 100 in which a fuel cell stack 1 is mounted as an on-vehicle power supply. The vehicular fuel cell system 10 according to the first embodiment includes a collision detector 2 which detects collision on the front and rear sides of the vehicle, a high voltage unit 3 (in this embodiment, a battery) which is arranged on one side of the front and rear sides of the vehicle and has a high voltage, a high voltage controller 4 which is arranged on one side and controls the high voltage unit 3, a hydrogen supply unit 5 which is arranged on the other side of the front and rear sides of the vehicle and supplies hydrogen to the fuel cell stack 1, and a supply valve controller 8 which is arranged on the other side and controls a hydrogen supply valve 7 configured to shut off a supply path 6 of hydrogen from the hydrogen supply unit 5 to the fuel cell stack 1.

The collision detector 2 is, for example, an airbag control device which controls an airbag. The airbag control device is provided near the vehicle center inside an occupant space 101 unsusceptible to an impact of collision from all directions of the vehicle. The airbag control device can detect collision on the front or rear side of the vehicle based on an acceleration detected by an internal acceleration sensor. For example, the airbag control device detects collision on the front or rear side of the vehicle if the acceleration of the acceleration sensor is equal to or greater than a predetermined threshold.

For example, the collision detector 2 and the high voltage controller 4 are connected to each other through a wiring 9 passing through the vehicle center unsusceptible to an impact of vehicle collision. Similarly, the collision detector 2 and the supply valve controller 8 are connected to each other through a wiring 9 passing though the vehicle center unsusceptible to an impact of vehicle collision. If collision on the on the front and rear sides of the vehicle is detected, the collision detector 2 outputs a collision signal to the high voltage controller 4 and the supply valve controller 8.

The high voltage unit 3 is arranged, for example, on the front right side of the vehicle. The high voltage unit 3 is a high voltage line (a smoothing capacitor and the like) of a power controller (PCU) which requires high voltage discharging. The high voltage unit 3 is provided with a high voltage line having a high voltage, or the like.

The high voltage controller 4 is arranged, for example, on the front right side of the vehicle, and is connected to the high voltage unit 3 through a signal line. The high voltage controller 4 is arranged at a location adjacent to the occupant space 101 on the front side of the vehicle with little impact at the time of collision. The high voltage controller 4 is arranged in the vicinity of the high voltage unit 3 for reduction in noise of the signal line and reduction in weight. The high voltage unit 3 and the high voltage controller 4 may be arranged on the front left side of the vehicle.

The hydrogen supply unit 5 is arranged, for example, on the rear side of the vehicle. The hydrogen supply unit 5 includes a device which supplies hydrogen gas to an anode of the fuel cell stack 1 (a hydrogen storage tank 51 which stores hydrogen gas, a reformer which reforms raw fuel to hydrogen-rich gas, and the like) and auxiliaries (a regulator, a humidifier, and the like).

The fuel cell stack 1 supplies hydrogen gas and oxidized gas to an electrolyte/electrode catalyst composite to cause an electrochemical reaction and to convert chemical energy to electric energy. The fuel cell stack 1 has, for example, a stack structure in which a plurality of single cells each having an anode and a cathode arranged to face each other on both surfaces of a solid polyelectrolyte membrane and the outside thereof sandwiched between a pair of separators are laminated.

The hydrogen supply unit 5 supplies hydrogen gas to the anode of the fuel cell stack 1 through the supply path 6. The supply path 6 is provided with the hydrogen supply valve 7 which shuts off the supply path 6 of hydrogen from the hydrogen storage tank 51 of the hydrogen supply unit 5 to the fuel cell stack 1. The hydrogen supply valve 7 is provided, for example, in the vicinity of the hydrogen storage tank 51 of the hydrogen supply unit 5 on the rear left side of the vehicle. The hydrogen supply valve 7 is opened or closed in response to a control instruction from the supply valve controller 8.

The supply valve controller 8 is arranged, for example, on the rear left side of the vehicle, and is connected to the hydrogen supply valve 7 through a signal line. The supply valve controller 8 is arranged at a location adjacent to the occupant space 101 on the rear side of the vehicle with little impact at the time of collision. The supply valve controller 8 is provided in the vicinity of the hydrogen supply valve 7 for reduction in noise of the signal line and reduction of weight. The high voltage controller 4 and the supply valve controller 8 are arranged diagonally on the vehicle. The hydrogen supply valve 7 and the supply valve controller 8 may be arranged on the rear right side of the vehicle.

The high voltage controller 4 and the supply valve controller 8 are constituted by hardware, for example, centering on a microcomputer having a central processing unit (CPU) which performs computation processing, control processing, and the like, a read only memory (ROM) which stores a computation program, a control program, and the like to be executed by the CPU, a random access memory (RAM) which stores various kinds of data or the like, an interface unit (I/F) which performs an input/output of signals with the outside. The CPU, the ROM, the RAM, and the interface unit are connected to one another through a data bus or the like.

On the other hand, for example, in a case where an object collides against the front of the vehicle, the high voltage line or the like of the high voltage unit arranged on the front side of the vehicle may be exposed. For this reason, at the time of vehicle collision, discharging of the high voltage unit needs to be performed, and the voltage of the high voltage line needs to be reliably dropped. However, in the related art, the high voltage controller which controls the discharging of the high voltage unit is arranged on the front side of the collided vehicle. For this reason, there is a concern that failure or the like of the high voltage controller is caused by an impact at the time of collision, and it is not possible to properly control the discharging of the high voltage unit.

Similarly, in a case where an object collides against the rear of the vehicle, hydrogen may leak from the hydrogen supply unit on the rear side of the vehicle. For this reason, at the time of vehicle collision, the hydrogen supply valve of the hydrogen storage tank needs to be brought into a closed state to reliably prevent hydrogen leakage. However, in the related art, the supply valve controller which controls the hydrogen supply valve is arranged on the rear side of the collided vehicle. For this reason, there is a concern that failure or the like of the supply valve controller is caused by an impact at the time of collision, and it is not possible to properly control the hydrogen supply valve.

In contrast, in the vehicular fuel cell system 10 according to the first embodiment, if collision on one side or the other side of the front and rear sides of the vehicle is detected by the collision detector 2, the supply valve controller 8 on the other side performs control for discharging the high voltage unit 3, and the high voltage controller 4 on one side performs control for bringing the hydrogen supply valve 7 into the closed state. With this, in a case where collision occurs on one side of the vehicle and the high voltage controller 4 on one side fails, the supply valve controller 8 which is at a location separated from a collision part on the other side of the vehicle unsusceptible to an impact of collision reliably performs control for discharging the high voltage unit 3. In addition, even in a case where collision occurs on the other side of the vehicle and the supply valve controller 8 on the other side fails, the high voltage controller 4 which is at a location separated from a collision part on one side of the vehicle unsusceptible to an impact of collision reliably performs control for bringing the hydrogen supply valve 7 into the closed state. That is, even in a case where vehicle collision occurs, it is possible to reliably stop the function of a control target.

Both of the front and rear sides of the vehicle are rarely broken simultaneously even in double collision. In addition, in the first embodiment, the high voltage controller 4 and the supply valve controller 8 are arranged at locations adjacent to the occupant space 101 on the front and rear sides of the vehicle with little impact at the time of collision. For this reason, the high voltage controller 4 and the supply valve controller 8 hardly fail simultaneously due to collision. Accordingly, in the first embodiment, as described above, even in a case where collision occurs, at least one of the high voltage controller 4 or the supply valve controller 8 reliably functions normally, and the discharging control of the high voltage unit 3 or the shut-off control of the hydrogen supply valve 7 can be performed on the side which reliably functions normally.

In order to reliably execute the discharging control of the high voltage unit 3 and the shut-off control of the hydrogen supply valve 7 at the time of vehicle collision, for example, a case where the high voltage controller and the supply valve controller respectively have the functions of the discharging control of the high voltage unit and the shut-off control of the hydrogen supply valve is considered. However, in this case, the configurations of the high voltage controller and the supply valve controller become redundant, and a double wiring is provided for the high voltage unit and the hydrogen supply valve, causing an increase in costs and weight.

In contrast, the vehicular fuel cell system 10 according to the first embodiment has a simple configuration in which only the supply valve controller 8 has the function of the discharging control of the high voltage unit 3, and only the high voltage controller 4 has the function of the shut-off control of the hydrogen supply valve 7. A double wiring does not need to be provided for the high voltage unit 3 and the hydrogen supply valve 7. For this reason, it is possible to achieve reduction in costs and weight of the vehicular fuel cell system 10.

For example, if collision on the front or rear side of the vehicle is detected, the collision detector 2 transmits a collision signal to the high voltage controller 4 on the front side of the vehicle and the supply valve controller 8 on the rear side of the vehicle. At this time, collision on the front side of the vehicle may cause failure or the like in the high voltage controller 4 on the front side of the vehicle. However, the normal supply valve controller 8 on the rear side of the vehicle performs control for discharging the high voltage unit 3 by transmitting a control signal to the high voltage unit 3 in response to the collision signal from the collision detector 2. With this, even in a case where collision occurs on the front side of the vehicle, the normal supply valve controller 8 on the rear side of the vehicle can reliably perform control for discharging the high voltage unit 3.

On the other hand, collision on the rear side of the vehicle may cause failure or the like in the supply valve controller 8 on the rear side of the vehicle. However, the normal high voltage controller 4 on the front side of the vehicle performs control for brining the hydrogen supply valve 7 into the closed state by transmitting a control signal to the hydrogen supply valve 7 in response to the collision signal from the collision detector 2. With this, even in a case where collision occurs on the rear side of the vehicle, the normal high voltage controller 4 on the front side of the vehicle can reliably perform control for bringing the hydrogen supply valve 7 into the closed state.

Figure 2:
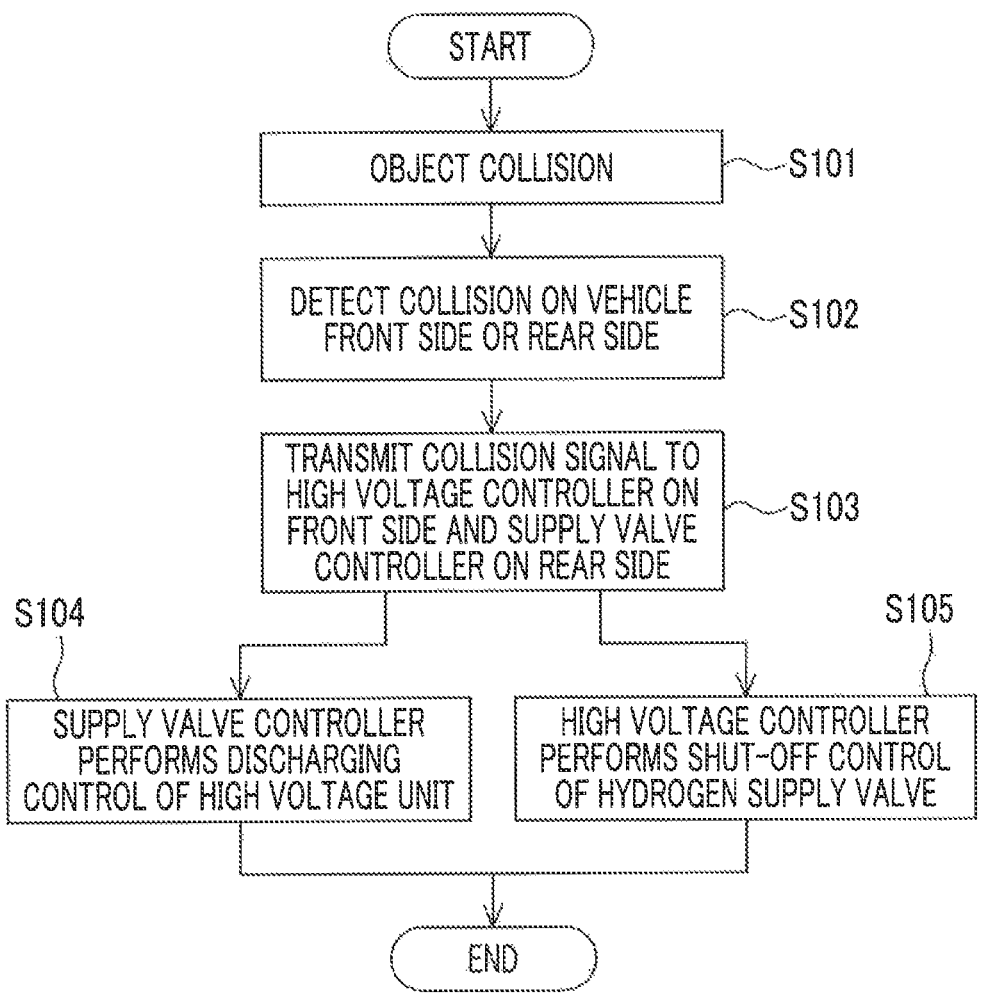
FIG. 2 is a flowchart showing a method of controlling the vehicular fuel cell system according to the first embodiment of the disclosure.

FIG. 2 is a flowchart showing a method of controlling the vehicular fuel cell system according to the first embodiment. If an object collides against the vehicle (Step S101), the collision detector 2 detects collision on the front or rear side of the vehicle (Step S102).

If collision on the front or rear side of the vehicle is detected, the collision detector 2 transmits the collision signal to the high voltage controller 4 on the front side of the vehicle and the supply valve controller 8 on the rear side of the vehicle (Step S103). The supply valve controller 8 on the rear side of the vehicle performs control for discharging the high voltage unit 3 on the front side of the vehicle in response to the collision signal from the collision detector 2 (Step S104). The high voltage controller 4 on the front side of the vehicle performs control for bringing the hydrogen supply valve 7 on the rear side of the vehicle into the closed state in response to the collision signal from the collision detector 2 (Step S105).

As described above, in the vehicular fuel cell system 10 according to the first embodiment, if collision on one side or the other side of the front and rear sides of the vehicle is detected by the collision detector 2, the supply valve controller 8 on the other side performs control for discharging the high voltage unit 3 on one side, and the high voltage controller 4 on one side performs control for bringing, at hydrogen supply valve 7 on the other side into the closed state. With this, in a case where collision occurs on one side of the vehicle, the supply valve controller 8 which is at a location separated from a collision part on the other side of the vehicle unsusceptible to image of collision reliably performs control for discharging the high voltage unit 3 on one side. In a case where collision occurs on the other side of the vehicle, the high voltage controller 4 which is at a location separated from a collision part on one side of the vehicle unsusceptible to image of collision reliably performs control for bringing the hydrogen supply valve 7 on the other side into the closed state. That is, even in a case where vehicle collision occurs, it is possible to reliably stop the function of a control target.

In the first embodiment described above, although the high voltage unit 3 and the high voltage controller 4 are arranged on the front side of the vehicle, and the hydrogen supply unit 5, the hydrogen supply valve 7, and the supply valve controller 8 are arranged on the rear side of the vehicle, the disclosure is not limited thereto. The high voltage unit 3 and the high voltage controller 4 may be arranged on the rear side of the vehicle, and the hydrogen supply unit 5, the hydrogen supply valve 7, and the supply valve controller 8 may be arranged on the front side of the vehicle.

In a vehicle in which the vehicular fuel cell system 10 is mounted, in order to extend a cruising distance, the amount of hydrogen stored in the hydrogen storage tank 51 of the hydrogen supply unit 5 increases, and the tank capacity increases. For this reason, in consideration of vehicle weight distribution, as described above, the hydrogen storage tank 51 of the hydrogen supply unit 5 and the high voltage unit 3 which is a different large component are mounted separately on the front and rear sides of the vehicle.

If collision on the front or rear side of the vehicle is detected, the collision detector 2 transmits the collision signal to the supply valve controller 8 on the front side of the vehicle and the high voltage controller 4 on the rear side of the vehicle. The high voltage controller 4 on the rear side of the vehicle performs control for bringing the hydrogen supply valve 7 on the front side of the vehicle into the closed state in response to the collision signal from the collision detector 2. The supply valve controller 8 on the front side of the vehicle performs control for discharging the high voltage unit 3 on the rear side of the vehicle in response to the collision signal from the collision detector 2.

Second Embodiment

Figure 3:
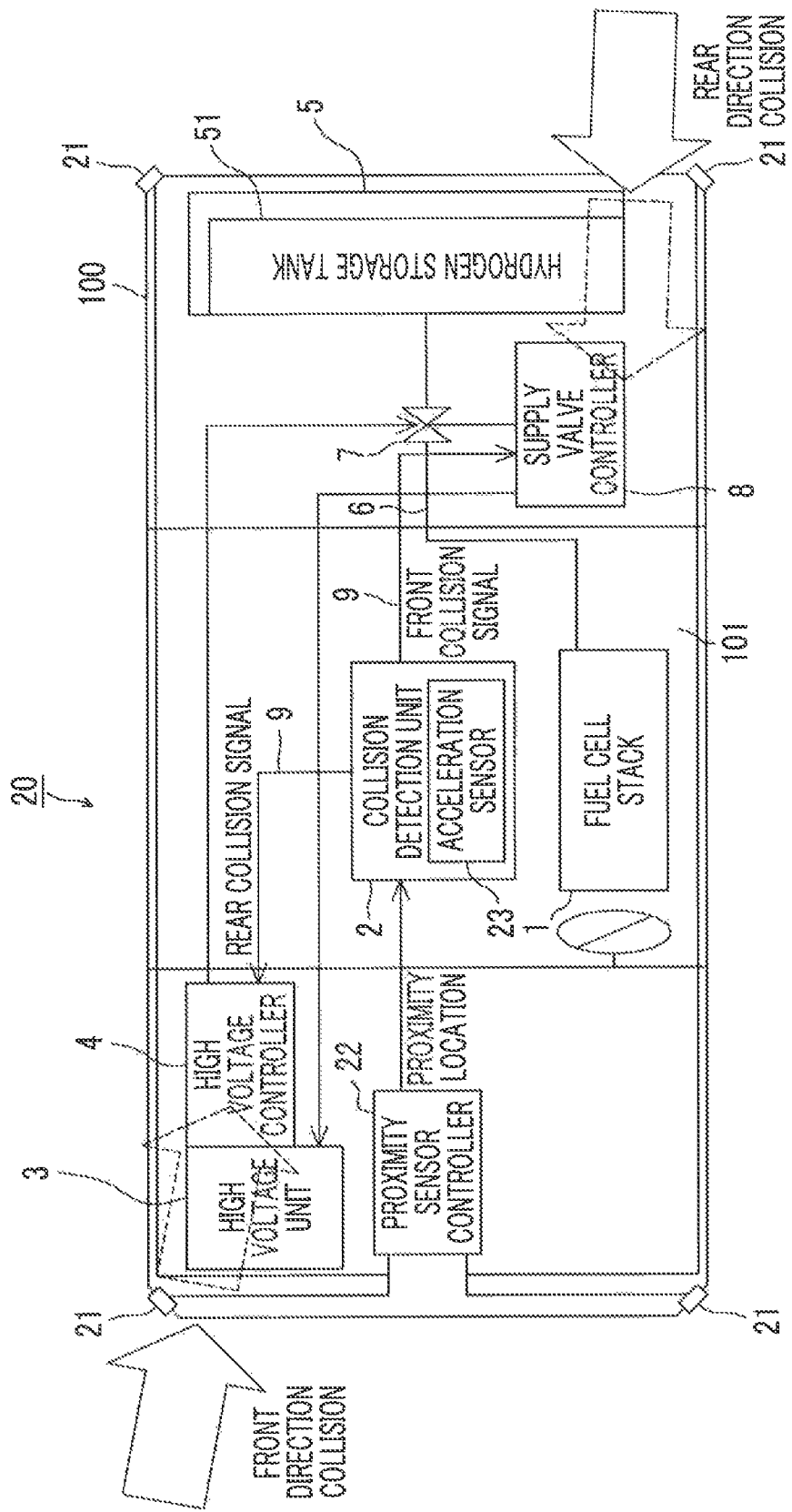
FIG. 3 is a block diagram showing a schematic system configuration of a vehicular fuel cell system according to a second embodiment of the disclosure.

FIG. 3 is a block diagram showing a schematic system configuration of a vehicular fuel cell system 20 according to a second embodiment of the disclosure. In the second embodiment, a plurality of proximity sensors 21 which detect distance information with respect to an object are provided on the front and rear sides of the vehicle in the periphery of the vehicle. The proximity sensors 21 are, for example, ultrasonic sensors, radar sensors, or the like. For example, a pair of proximity sensors 21 are provided near both ends of the front side of the vehicle (a front bumper or the like) and a pair of proximity sensors 21 are provided near both ends of the rear side of the vehicle (a rear bumper or the like). The locations and the number of proximity sensors 21 provided in the periphery of the vehicle are arbitrarily determined as long as the proximity sensors 21 are respectively provided on the front and rear sides of the vehicle.

On the front side of the vehicle, a proximity sensor controller 22 which detects an approaching location, at which an object approaches the vehicle, based on the distance information from the respective proximity sensors 21 is provided. The proximity sensor controller 22 may be provided near the vehicle center or on the rear side of the vehicle. For example, the proximity sensor controller 22 extracts the proximity sensor 21 having a distance value equal to or less than a predetermined threshold among the proximity sensors 21 and detects the location of the proximity sensor 21 as the approaching location of the object. The proximity sensor controller 22 outputs the detected approaching location of the object to the collision detector 2. The collision detector 2 may include the proximity sensor controller 22.

For example, if the distance value of the proximity sensor 21 on the front right side of the vehicle is equal to or less than the predetermined threshold, the proximity sensor controller 22 detects the front right side of the vehicle corresponding to the location of the proximity sensor 21 as the approaching location of the object. Similarly, when the distance value of the proximity sensor 21 on the rear left side of the vehicle is equal to or less than the predetermined threshold, the proximity sensor controller 22 detects the rear left side of the vehicle corresponding to the location of the proximity sensor 21 as the approaching location of the object.

The collision detector 2 detects vehicle collision, for example, if an acceleration of an acceleration sensor (airbag control device) 23 becomes equal to or greater than a predetermined value, and determines the collision location (front collision on the front side of the vehicle and rear collision on the rear side of the vehicle) of the vehicle based on the proximity location from the proximity sensor controller 22.

If it is determined that the collision location of the vehicle is front collision, the collision detector 2 transmits a front collision signal to the supply valve controller 8 on the rear side. The supply valve controller 8 on the rear side performs control for discharging the high voltage unit 3 on the front side in response to the front collision signal from the collision detector 2. While collision on the front side of the vehicle may cause failure or the like in the high voltage controller 4 on the front side of the vehicle, the normal supply valve controller 8 on the rear side of the vehicle can reliably perform control for discharging the high voltage unit 3 in response to the front collision signal from the collision detector 2.

If it is determined that the collision location of the vehicle is rear collision, the collision detector 2 transmits a rear collision signal to the high voltage controller 4 on the front side. The high voltage controller 4 on the front side performs control for bringing the hydrogen supply valve 7 on the rear side into the closed state in response to the rear collision signal from the collision detector 2.

While collision on the rear side of the vehicle may cause failure or the like in the supply valve controller 8 on the rear side of the vehicle, the normal high voltage controller 4 on the front side of the vehicle can reliably perform control for bringing the hydrogen supply valve 7 into the closed state in response to the rear collision signal from the collision detector 2.

In the first embodiment described above, if vehicle collision is detected, both of the discharging control of the high voltage unit 3 and the shut-off control of the hydrogen supply valve are executed, and both functions of the high voltage unit 3 and the hydrogen supply unit 5 are stopped. On the other hand, in the second embodiment, only the control on one side, on which collision is detected, between the discharging control of the high voltage unit 3 on the front side of the vehicle and the shut-off control of the hydrogen supply valve 7 on the rear side of the vehicle is executed by determining the collision location of the vehicle using the proximity sensors 21. With this, it is possible to stop only the function of the side, on which collision is detected, between the high voltage unit 3 on the front side of the vehicle and the hydrogen supply unit 5 on the rear side of the vehicle, and to continue the function on the side on which collision is not detected. In the second embodiment, the same parts as those in the first embodiment described above are represented by the same reference numerals, and detailed description thereof will not be repeated.

Third Embodiment

Figure 4:
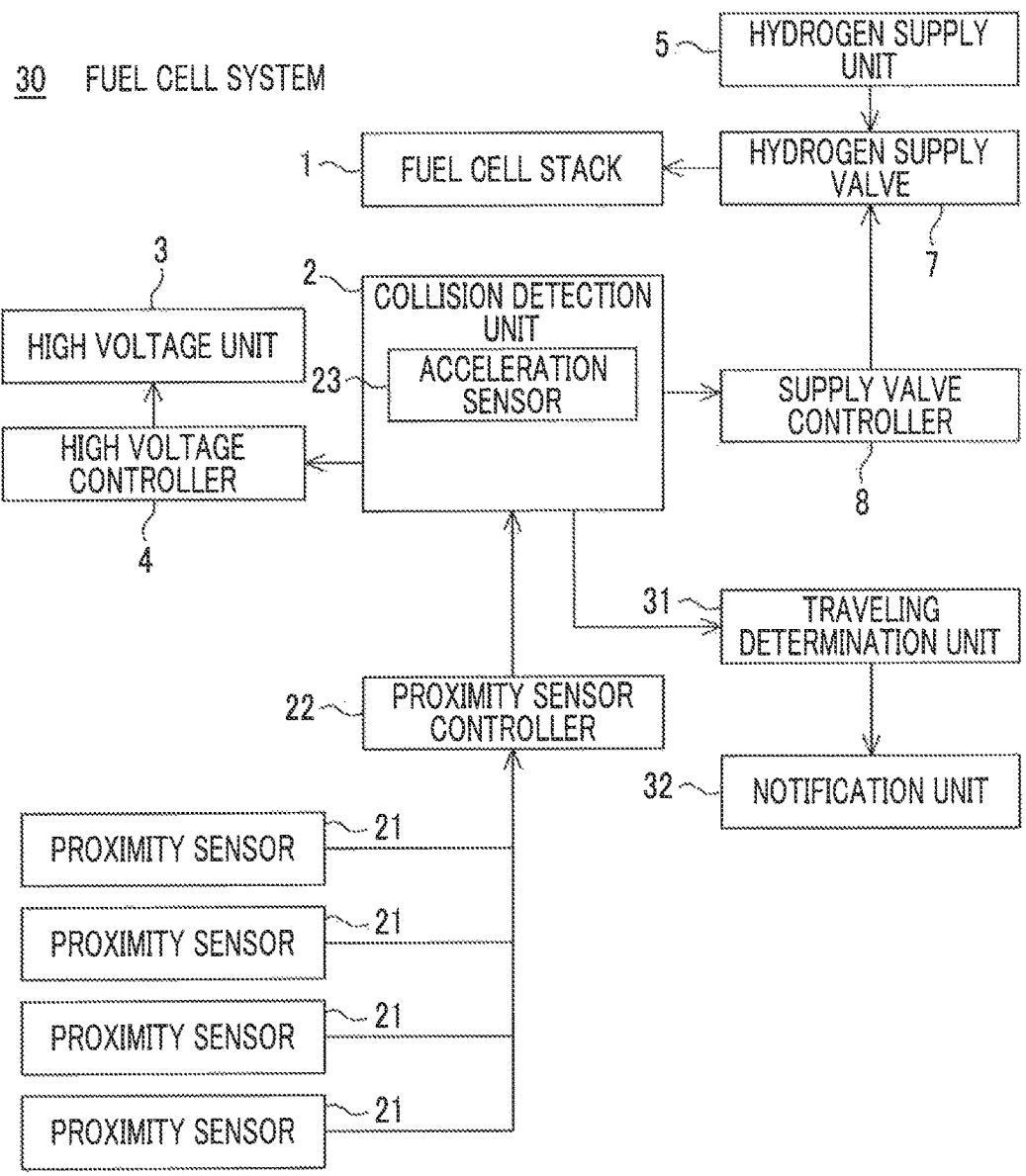
FIG. 4 is a block diagram showing a schematic system configuration of a vehicular fuel cell system according to a third embodiment of the disclosure.

FIG. 4 is a block diagram showing a schematic system configuration of a vehicular fuel cell system according to a third embodiment of the disclosure. A vehicular fuel cell system 30 according to the third embodiment further includes a traveling determination unit 31 which determines whether or not the vehicle is travelable after vehicle collision, in addition to the configuration according to the second embodiment described above.

In a case where collision actually occurs, as described above, it is necessary to not only stop the function of a required control target, such as the discharging control of the high voltage unit 3, or the shut-off control of the hydrogen supply valve 7, but also quickly retreat the vehicle from a collision place (a traveling lane of an expressway, an intersection with heavy traffic, or the like). However, there are a case where retreat traveling should be performed and a case where retreat traveling should not be performed according to the location of a portion broken due to vehicle collision.

For example, it is assumed that, in a case where a component (a motor, a high voltage battery, a PCU, or the like) related to electric traveling (EV traveling), in which a vehicle travels with electric power, is arranged on the front side of the vehicle, collision occurs on the rear side of the vehicle. In this case, since there is a high possibility that a component related to electric traveling on the front side of the vehicle is normal, it is possible to retreat the vehicle in a retreat traveling mode or the like. In a case where collision occurs on the front side of the vehicle, even if a self-diagnosis system determines that electric traveling is possible, damage due to collision may remain in any portion of the system (breakage of a sheath of a high voltage wiring causing short-circuiting of a wiring, or the like), and this may not be detected. In this case, it is determined that retreat traveling is impossible, and retreat traveling should not be performed unreasonably.

Accordingly, in the third embodiment, if the collision detector 2 detects collision on the front side, the supply valve controller 8 on the rear side performs the discharging control for discharging the high voltage unit 3 on the front side according to a detection result of the collision detector 2, the traveling determination unit 31 determines that the vehicle is in a traveling-disabled state according to the detection result of the collision detector 2, and a notification unit 32 gives notification to the effect that the vehicle is in the traveling-disabled state. With this, when collision on the front side is detected, it is possible to give the user notification to the effect that the vehicle is in the traveling-disabled state, and to prevent unreasonable retreat traveling while reliably performing the discharging control of the high voltage unit 3 on the front side.

FIG. 5 is a flowchart showing a control processing flow of the vehicular fuel cell system according to the third embodiment. The proximity sensor controller 22 detects the approaching location, at which an object approaches the vehicle, based on the distance information from the respective proximity sensors 21 and outputs the detected approaching location to the collision detector 2 (Step S201).

If the acceleration of the acceleration sensor 23 is equal to or greater than the predetermined value, the collision detector 2 detects vehicle collision (Step S202), and determines whether or not the collision location is rear collision based on the approaching location from the proximity sensor controller 22 (Step S203).

If it is determined that the collision location of the vehicle is not rear collision and is front collision (No in Step S203), the collision detector 2 transmits the front collision signal to the supply valve controller 8 on the rear side (Step S204). The supply valve controller 8 on the rear side performs control for discharging the high voltage unit 3 on the front side in response to the front collision signal from the collision detector 2 (Step S205).

If the traveling determination unit 31 determines that the vehicle is switched to the retreat traveling mode for activating a retreat traveling system (YES in Step S206), the notification unit 32 gives the user notification to the effect that retreat traveling is impossible (Step S207), and this processing ends. The notification unit 32 is, for example, a display device (a liquid crystal display, an organic EL, or the like) in an odometer, a speaker, or the like.

If it is determined that the collision location of the vehicle is rear collision (YES in Step S203), the collision detector 2 transmits the rear collision signal to the high voltage controller 4 on the front side and the traveling determination unit 31 (Step S208). The high voltage controller 4 on the front side performs control for bringing the hydrogen supply valve 7 on the rear side into the closed state in response to the rear collision signal from the collision detector 2 (Step S209), and this processing ends. At this time, the notification unit 32 may give the user notification to the effect that retreat traveling is possible.

The disclosure is not limited to the foregoing embodiments, and can be appropriately changed without departing from the disclosure. In the disclosure, for example, the processing shown in FIG. 2 can be realized by making a CPU execute a computer program. The program can be stored using various types of non-transitory computer-readable mediums and can be supplied to a computer. The non-transitory computer-readable mediums include various types of tangible storage mediums. Examples of the non-transitory computer-readable mediums include a magnetic storage medium (for example, a flexible disk, a magnetic tape, a hard disk drive), a magneto-optical storage medium (for example, a magneto-optical disk), a compact disk-read only memory (CD-ROM), a CD-R, a CD-R/W, and a semiconductor memory (for example, a mask ROM, a programmable ROM (PROM), an erasable PROM (EPROM), a flash ROM, and a random access memory (RAM)).

The program may be supplied to the computer by various types of transitory computer-readable mediums. Examples of the transitory computer-readable mediums include an electrical signal, an optical signal, and an electromagnetic wave. The transitory computer-readable mediums can supply the program to the computer through a wired communication path, such as an electric wire and an optical fiber, or a wireless communication path.

What is claimed is:

1. A vehicular fuel cell system comprising:
   a collision detector configured to detect collision on front and rear sides of a vehicle;
   a voltage unit arranged on one side of the front and rear sides of the vehicle and having a voltage;
   a voltage controller arranged on the one side and configured to control the voltage unit;
   a hydrogen supply unit arranged on the other side of the front and rear sides of the vehicle and configured to supply hydrogen to a fuel cell stack; and
   a supply valve controller arranged on the other side and configured to control a hydrogen supply valve, the hydrogen supply valve being configured to shut off a supply path of hydrogen from the hydrogen supply unit to the fuel cell stack,
   wherein the supply valve controller is programmed to, when collision is detected by the collision detector, perform discharging control for discharging the voltage unit on the one side, and the voltage controller is programmed to, when collision is detected by the collision detector, perform shut-off control for bringing the hydrogen supply valve on the other side into a closed state.

2. The vehicular fuel cell system according to claim 1,
   wherein a proximity sensor configured to detect distance information with respect to an object is provided on each of the one side and the other side in a periphery of the vehicle,
   the supply valve controller is programmed to, when the collision detector detects collision on the one side based on the distance information from the proximity sensor on the one side, perform the discharging control for discharging the voltage unit according to a detection result of the collision detector, and
   the voltage controller is programmed to, when the collision detector detects collision on the other side based on the distance information from the proximity sensor on the other side, perform the shut-off control for bringing the hydrogen supply valve into the closed state according to the detection result of the collision detector.

3. The vehicular fuel cell system according to claim 1, further comprising:
   a traveling determination unit configured to determine whether or not the vehicle is in a traveling-disabled state; and
   a notification unit configured to give a user notification that the vehicle is in the traveling-disabled state,
   wherein, when the collision detector detects collision on the one side, the supply valve controller on the other side is programmed to perform the discharging control for discharging the voltage unit according to a detection result of the collision detector, the traveling determination unit determines that the vehicle is in the traveling-disabled state according to the detection result of the collision detector, and the notification unit gives notification to the effect that the vehicle is in the traveling-disabled state.

4. The vehicular fuel cell system according to claim 1, wherein the voltage controller is provided closer to a vehicle center than the voltage unit in a front-rear direction of the vehicle.

5. The vehicular fuel cell system according to claim 1, wherein the hydrogen supply unit includes a hydrogen storage tank, and
   the supply valve controller is provided closer to a vehicle center than the hydrogen storage tank in a front-rear direction of the vehicle.

6. The vehicular fuel cell system according to claim 1, wherein the voltage unit includes a battery.

7. A method of controlling a vehicular fuel cell system, wherein the vehicular fuel cell system includes
   a voltage unit arranged on one side of front and rear sides of a vehicle and having a voltage,
   a voltage controller arranged on the one side and configured to control the voltage unit,
   a hydrogen supply unit arranged on the other side of the front and rear sides of the vehicle and configured to supply hydrogen to a fuel cell stack, and
   a supply valve controller arranged on the other side and configured to control a hydrogen supply valve, the hydrogen supply valve being configured to shut off a supply path of hydrogen from the hydrogen supply unit to the fuel cell stack,
   wherein when collision on the one side or the other side is detected, the supply valve controller on the other side performs discharging control for discharging the voltage unit on the one side, and the voltage controller on the one side performs shut-off control for bringing the hydrogen supply valve on the other side into a closed state.

* * * * *